(12) United States Patent
Downey et al.

(10) Patent No.: US 7,093,211 B1
(45) Date of Patent: Aug. 15, 2006

(54) TECHNIQUES FOR MODELING CURRENT SPREADING UNIFORMITY IN LIGHT EMITTING DIODES

(75) Inventors: Evan Downey, Niskayuna, NY (US); Abasifreke Ebong, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 435 days.

(21) Appl. No.: 10/700,074

(22) Filed: Nov. 3, 2003

(51) Int. Cl.
*G06F 17/50* (2006.01)

(52) U.S. Cl. .................................. 716/4; 716/5; 716/6
(58) Field of Classification Search ................. 716/4–6
See application file for complete search history.

(56) References Cited

U.S. PATENT DOCUMENTS

| | | | | |
|---|---|---|---|---|
| 5,084,824 | A * | 1/1992 | Lam et al. ..................... | 716/11 |
| 5,153,889 | A * | 10/1992 | Sugawara et al. ........ | 372/45.01 |
| 5,685,006 | A * | 11/1997 | Shiraishi ...................... | 712/34 |
| 5,984,510 | A * | 11/1999 | Guruswamy et al. .......... | 716/2 |
| 5,987,086 | A * | 11/1999 | Raman et al. .................. | 716/1 |
| 6,219,630 | B1 * | 4/2001 | Yonezawa et al. ............ | 703/14 |
| 6,292,766 | B1 * | 9/2001 | Mattos et al. ................. | 703/14 |
| 6,370,674 | B1 * | 4/2002 | Thill .............................. | 716/4 |
| 6,405,148 | B1 * | 6/2002 | Hayashi et al. ............. | 702/117 |
| 6,480,989 | B1 * | 11/2002 | Chan et al. ..................... | 716/8 |
| 6,721,614 | B1 * | 4/2004 | Duncan et al. ............... | 700/97 |
| 6,756,242 | B1 * | 6/2004 | Regan .......................... | 438/14 |
| 6,759,850 | B1 * | 7/2004 | Harzanu et al. ............. | 324/522 |
| 6,823,500 | B1 * | 11/2004 | Ganesh et al. ................. | 716/9 |
| 6,834,380 | B1 * | 12/2004 | Khazei ........................ | 716/10 |
| 6,865,726 | B1 * | 3/2005 | Igusa et al. ................... | 716/18 |
| 2003/0121468 | A1 * | 7/2003 | Boone et al. ................. | 117/78 |
| 2006/0036416 | A1 * | 2/2006 | Lee et al. ....................... | 703/2 |

\* cited by examiner

*Primary Examiner*—Stacy A. Whitmore
*Assistant Examiner*—Naum B. Levin
(74) *Attorney, Agent, or Firm*—Fletcher Yoder (57) ABSTRACT

Techniques for automatically generating three dimensional geometric circuit models from a computer aided design (CAD) of a light emitting diode (LED) device. The models may comprise a robust netlist that may be executed using circuit simulation packages. The spatial positioning of each element in the design is preserved during simulation, such that simulation output data can be used to reconstruct a geometric rendition or map of the electrical current flowing through the LED device. The output data from the circuit simulation may then used to reconstruct a three-dimensional rendition of the current spreading uniformity across the design and a quantitative value for the uniformity may be obtained. Using the present techniques, a designer can predict the current spreading uniformity for any particular LED layout, isolate and correct current crowding areas, and reevaluate the design to meet uniformity specifications.

22 Claims, 4 Drawing Sheets

TECHNIQUES FOR MODELING CURRENT SPREADING UNIFORMITY IN LIGHT EMITTING DIODES

BACKGROUND OF THE INVENTION

Electrical current uniformity is critical to the performance and reliability of light emitting diodes (LEDs). By optimizing current spreading uniformly across an LED device, losses due to current crowding in parts of the device are eliminated, efficiency is enhanced, and light extraction is maximized. Thermal and optical performance characteristics may also be optimized to further improve the operation and efficiency of the LED device.

Without the benefit of robust modeling technology, LED chip designers often design, manufacture, and characterize actual LED devices before optimizing the devices. After building, testing and characterizing the actual devices, the designers attempt to determine what changes to implement to best improve device performance. To test the improvement theories of the designers, the entire process is repeated, including build, manufacture and test. This approach may be a very costly and slow process. Typically, a manufacturing run may take two months and significant man-hours to complete.

To improve design characteristics and overall performance of the devices, software simulations may be implemented. Circuit simulation packages, such as SPICE, have been predominant in the industry for nearly two decades. Designers implement simulation packages, such as SPICE, by writing a schematic description or "netlist" (e.g., "SPICE deck") of the circuit and feeding the schematic description into SPICE for batch mode simulation. Using physics as the basis for the model, SPICE decks are typically written manually by the designer. Because of the difficulties associated with the manual process, SPICE decks are often minimized and simplified. As can be appreciated by those having ordinary skill in the art, a SPICE deck containing 1000 lines of code is generally considered large. A manually written SPICE netlist having less than 1000 lines of code, generally corresponds to less robust modeling. As can be appreciated, the manual process of writing netlists for circuit simulation may be slow and tedious. Further, physics modeling paradigms, such as SPICE, may not provide the capabilities for modeling all of the variables desirable for fully optimizing the device.

BRIEF DESCRIPTION OF THE INVENTION

In accordance with one embodiment of the present invention, there is provided a method of modeling a light emitting diode device comprising: automatically generating a netlist from a computer-aided design layout; and executing the netlist to produce an output correlative to current spreading uniformity for the light emitting diode device.

In accordance with another embodiment of the present invention, there is provided a method of modeling a light emitting diode device comprising: generating a computer-aided design layout of the light emitting diode device; fracturing the layout to convert design geometries into orthogonal rectangles defined by coordinates; scaling the layout to a specified element size, wherein the scaled layout includes each of a plurality of nodes, a plurality of resistors and a plurality of diodes each having a layer number and a unique coordinate associated therewith; automatically generating a netlist from the scaled layout; and executing the netlist to produce an output correlative to current spreading uniformity for the light emitting diode device.

In accordance with still another embodiment of the present invention, there is provided a method of modeling a light emitting diode device comprising: fracturing a computer aided design layout corresponding to the light emitting diode device to convert design geometries into orthogonal rectangles defined by coordinates; scaling the layout to a specified element size; adding a corresponding layer number and element value to elements and nodes in each of the orthogonal rectangles; automatically generating a netlist from the scaled layout; executing the netlist to produce a simulation output file; calculating currents associated with each of the elements; and producing a current output file comprising the currents associated with each of the elements.

In accordance with yet another embodiment of the present invention, there is provided a method of modeling a light emitting diode device comprising: automatically generating a netlist from a computer-aided design layout of the light emitting diode device, wherein the design layout comprises each of a plurality of nodes, a plurality of resistors and a plurality of diodes; uniquely naming each of the plurality of nodes, the plurality of resistors and the plurality of diodes in accordance with location within the design layout to produce a unique name corresponding therewith; and modeling the light emitting diode device using the netlist to produce a modeling output, wherein the modeling output comprises the unique name corresponding to each of the plurality of nodes, the plurality of resistors and the plurality of diodes.

In accordance with a further embodiment of the present invention, there is provided a computer-readable medium storing computer instructions for: automatically generating a netlist from a computer-aided design layout corresponding to a light emitting diode device.

In accordance with still a further embodiment of the present invention, there is provided a computer-readable medium storing computer instructions for: fracturing a computer-aided design layout corresponding to a light emitting diode device to convert design geometries into orthogonal rectangles defined by coordinates; scaling the layout to a specified element size, wherein the scaled layout includes each of a plurality of nodes, a plurality of resistors and a plurality of diodes each having a layer number and a unique coordinate associated therewith; and automatically generating a netlist from the scaled layout.

In accordance with yet a further embodiment of the present invention, there is provided a computer-readable medium storing computer instructions for: fracturing a computer aided design layout corresponding to a light emitting diode device to convert design geometries into orthogonal rectangles defined by coordinates; scaling the layout to a specified element size; adding a corresponding layer number and element value to elements and nodes in each of the orthogonal rectangles; automatically generating a netlist from the scaled layout; and producing a contour plot corresponding to current uniformity in the light emitting diode device and correlative to an executed simulation of the netlist.

DETAILED DESCRIPTION OF SPECIFIC EMBODIMENTS

As previously described, electrical current uniformity is important to the performance and reliability of light emitting diodes (LEDs). By optimizing current spreading uniformly across the device, losses due to current crowding in parts of the device are eliminated, efficiency is enhanced, and light extraction is maximized. Generally, the present embodiments provide techniques for modeling electrical current spreading both laterally across a light emitting diode (LED) device and vertically, through the LED device. As can be appreciated, by understanding and characterizing the current spreading through the LED device, the design of the LED device may be optimized for better performance.

To more accurately characterize the spatial spreading of current within the LED device, the typical physics modeling paradigm, such as those generated by SPICE applications, is translated into a three dimensional (3-D) geometric modeling paradigm such that the electrical behavior of the LED around critical layout features within the device can be better understood. The geometric model includes a number of sub-circuits or elements. Each element represents a local portion of the entire device which contributes to the overall performance of the device, both independently and based on the spatial relationship of the element to the elements surrounding it.

Accordingly, embodiments of the present techniques are directed to automatically generating three dimensional geometric circuit models from computer aided design (CAD) device data. The models may be automatically converted to a netlist and then executed using commercially available circuit simulation packages, such as SPICE. As further described below, when executed on a typical 1 mm square LED, the presently described modeling algorithm automatically generates robust netlists containing from 60,000 lines up to 300,000 lines or more of code. In addition, the spatial positioning of each element is preserved as it is executed by the simulation package, resulting in output data in such a form that can be used to easily reconstruct a geometric rendition or map of the electrical current flowing through the LED. The output data from the circuit simulation is thus used to reconstruct a three-dimensional rendition of the current spreading uniformity across the device and a quantitative value for the uniformity may be obtained. Using the present techniques, a designer can predict the current spreading uniformity for any particular LED layout, isolate and correct current crowding areas, and reevaluate the design to meet uniformity specifications. The model can be extended to include both thermal and optical performance evaluations as well. Advantageously, embodiments of the present techniques provide a design for six sigma (DFSS) approach to LED performance enhancement without the need for costly and slow design/manufacture/evaluate cycles.

Figure 1:
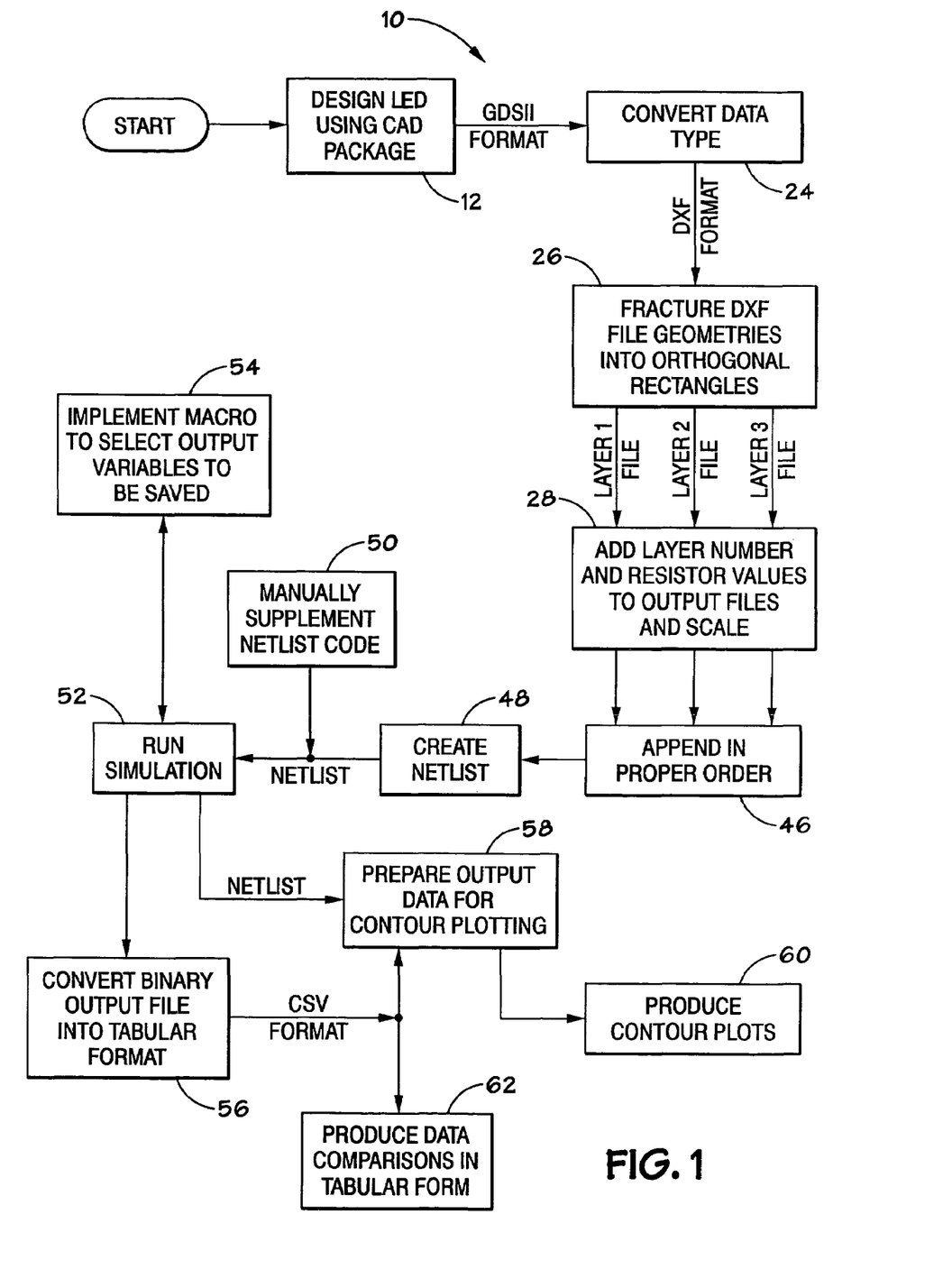
FIG. 1 is a flow chart illustrating the simulation process in accordance with embodiments of the present techniques.

Turning now to the figures, FIG. 1 is a flow chart 10 illustrating the simulation process in accordance with embodiments of the present techniques. Generally, the flow chart 10 includes a number of blocks indicating data processing and conversion steps. Each step may be implemented through a commercially available software application or through a software algorithm specifically written to accomplish the respective task, as will be discussed further below. FIGS. 2–5 will be discussed in turn, in conjunction with the corresponding step indicated in the flow chart 10 of FIG. 1.

Figure 2:
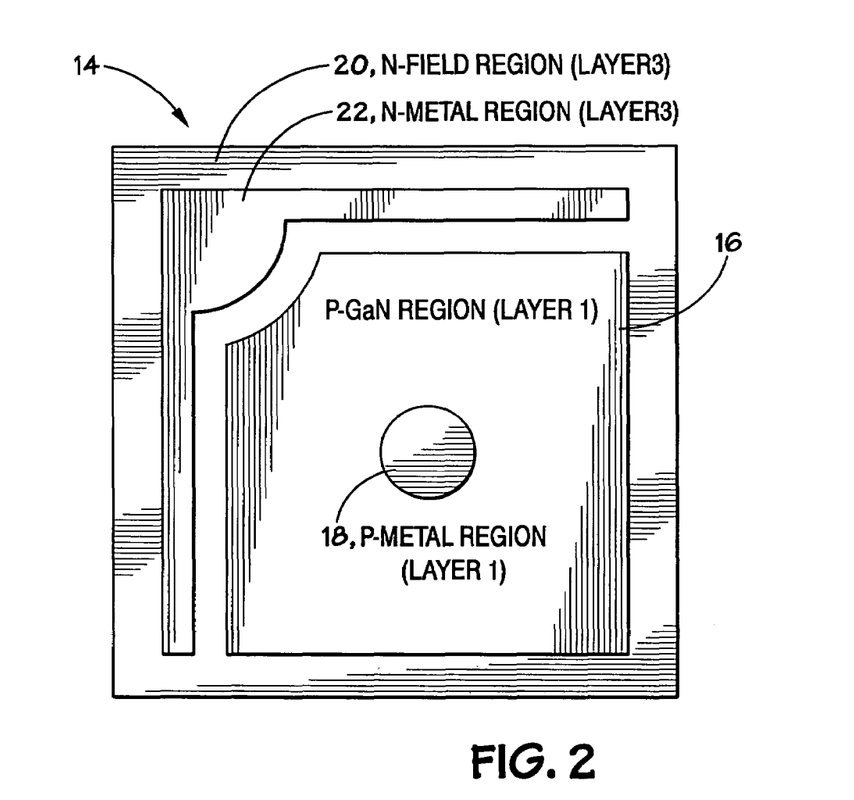
FIG. 2 is a top plan view of a CAD-based LED layout used to generate a simulation model in accordance with embodiments of the present techniques.

Initially, an LED device is designed using a computer-aided design (CAD) package, such as DW2000 or AutoCAD, as indicated in block 12 of FIG. 1. A top plan view of an exemplary embodiment of a portion of a typical LED device 14 designed using a CAD package is illustrated in FIG. 2. Generally, the layout of the LED device 14 illustrates two or more layers and associated layer numbers that may be implemented for modeling and depiction of relative positioning, as will be further discussed below. The exemplary LED device 14 includes three layers. More specifically, the LED device 14 includes a first layer (layer 1) having a P region, such as a gallium nitride (GaN) region 16 and one or more P-Metal contacts 18. The LED device 14 further includes a third layer (layer 3) having an N-Field region 20 and one or more N-Metal regions 22. As described further below, the second layer (layer 2) includes the active diodes of the LED device 14, as described further below with reference to FIG. 3.

In one exemplary embodiment of the LED device 14, the P—GaN region 16 has a medium low resistance in the range of approximately 0.01–0.1 ohms, and it is assumed, but not required, that the region of active diodes (layer 2) is formed where the P—GaN region 16 covers the N-Field region 20. The P-Metal region 18 has a very low resistance, in the range of approximately 0.001–0.010 ohms at the point of contact and may comprise metals such as nickel oxide (NiO) or gold (Au), for example. The N-Field region 20 has a high resistance, in the range of approximately 4.0–80.0 ohms and may comprise dielectric materials such as silicon nitride ($SiN_4$) or silicon dioxide ($SiO_2$), for example. The N-Metal region 22 has a low resistance, in the range of approximately 0.01–0.05 ohms at the point of contact and may comprise metals such as titanium (Ti) or gold (Au), for example. The construction of the CAD-based design is the first step in implementing the present techniques. The CAD-based design of the LED device 14 may be implemented to generate the LED model, as described further below.

Returning to the flow chart 10 illustrated in FIG. 1, the format of the output from the CAD system (e.g., the layout of the LED device 14), may be a GDSII stream file, for example. To manipulate the output file in accordance with the present techniques, the output file may be converted to a DXF format using commercially available GDSII-to-DXF conversion tools, such as AMS3500, for example, as indicated in block 24 of FIG. 1. As can be appreciated, the conversion tool will map the GDSII format layer numbers to useable DXF format layer names. Alternatively, the LED device 14 may be initially designed using a software package that produces a DXF output file, and the conversion step indicated in block 24 may be omitted.

Next, each layer of the DXF drawing is fractured using a software tool configured to convert all boundaries within the drawing, regardless of shape, to a series of orthogonal rectangles having definable coordinates, as indicated in block 26 of FIG. 1. As used herein, "fracturing" simply refers to defining the layout to a higher degree of resolution. By fracturing the layout to characterize the layout to a high degree of resolution, modeling in accordance with the present techniques may be achieved, as described further below. In one exemplary embodiment, the fracturing of the DXF drawing of the LED device 14 may produce an output file, wherein each orthogonal rectangle is defined by a lower-left (LL) x and y pair of coordinates and an upper-right (UR) x and y pair of coordinates. A single output file may be produced for each layer in the design. Accordingly, in the present exemplary embodiment, the fracturing algorithm may produce three output files, one for each of layers 1, 2 and 3 of the LED device 14.

After fracturing each layer of the layout of the LED device 14, resistance values are added to the output from the fracturing algorithm for use in the subsequent simulation steps. Further, the output from the fracturing algorithm is scaled to a specified element size and the layer numbers and scaled coordinates are added to the output generated by the fracturing algorithm. More specifically, each of the orthogonal rectangles or "boxes," is scaled and layer numbers and coordinates are added to each node and element such that these values can be retained and implemented in downstream modeling steps. In addition, the LL scaled coordinate values are snapped to an even grid and the UR scaled coordinate values are snapped to a grid divisible by four. As will be evident, this snapping is important for the algorithm implemented to generate the netlists used in the simulations (block 48), as described further below.

The scaling of the coordinates generally refers to the conversion of the coordinates from a metric value, such as microns, to an "element size." The element size is chosen to be smaller than the minimum critical spacing between design elements. Advantageously, smaller element sizes offer better resolution in the model output. However, smaller element sizes generally create larger data files. Data file size is limited by physical memory of the computer executing the simulation. Accordingly, the resolution of the scaling may be dependent on the size of the memory in the particular system implementing the simulation routine. Essentially, scaling provides an integer-based coordinate system with a fine enough resolution to ensure that each node of the LED device 14 can be identified by a unique identification based on the layer and horizontal proximity relative to the scaled coordinate system. The insertion of the layer number and resistance values for each of the boxes, as well as the scaling function are generally illustrated by block 28 in FIG. 1. The naming convention and scaling are further discussed below with reference to FIGS. 3 and 4.

Figure 3:
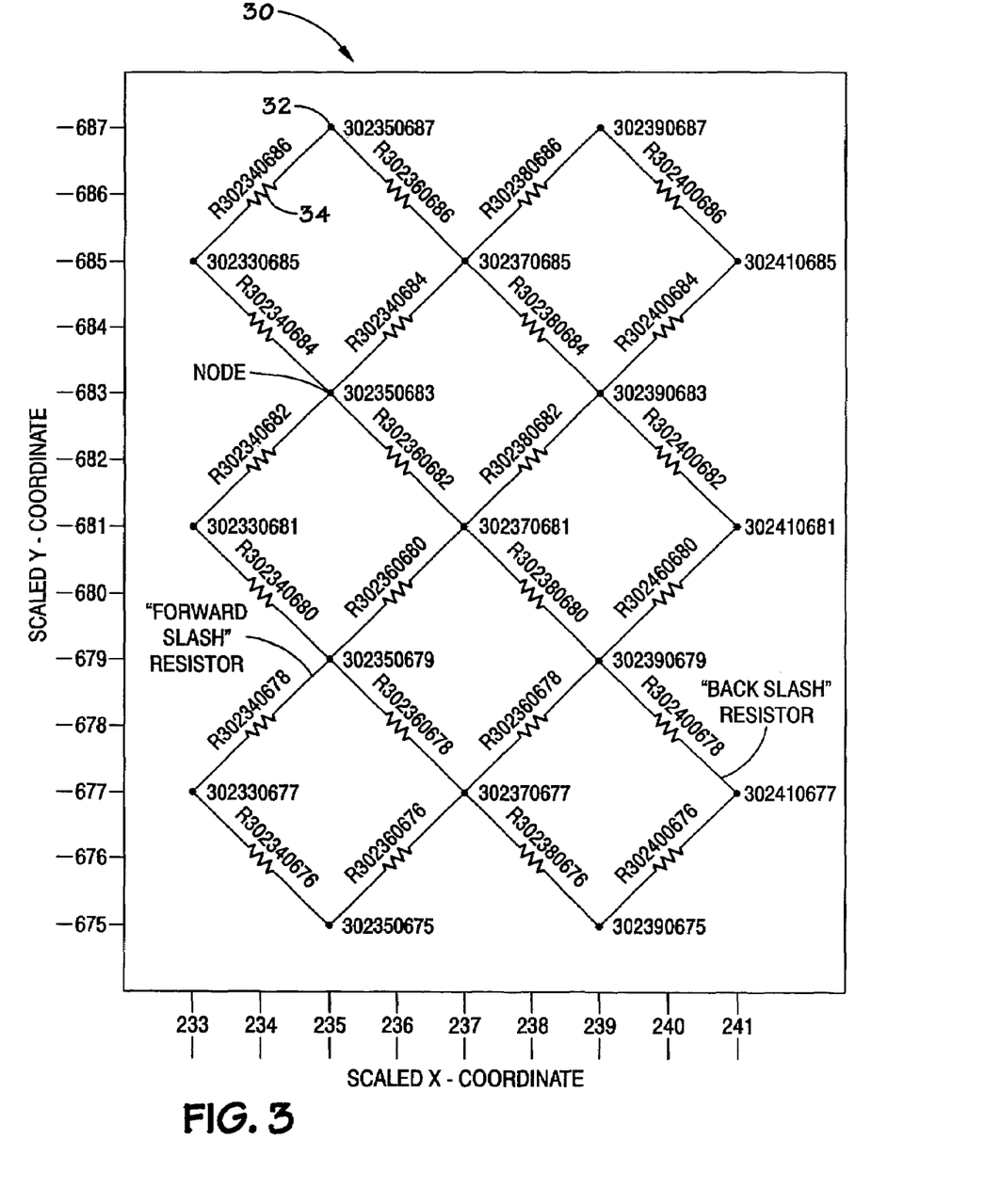
FIG. 3 is a schematic diagram illustrating a horizontal layer of an LED device having elements and nodes named in accordance with embodiments of the present techniques.

Turning briefly to FIG. 3, a layout of the resistor network associated with a vertical layer of the LED device 14 is illustrated to further describe the naming convention implemented in the scaling algorithm (block 28) and subsequent algorithms. As can be appreciated, "nodes" are simply connection terminals between resistors and/or diodes. FIG. 3 illustrates a single horizontal layer (here, layer 3) of the LED device 14, generally indicated by reference numeral 30. Nodes are depicted and marked as "Lxxxxyyyy" where L is the layer number and xxxx and yyyy are the scaled (x,y) coordinates for the node. According to the present embodiment, node coordinates xxxx and yyyy are always odd numbers. As can be appreciated, each node has a unique identification which indicates the layer number (here, layer 3) and the scaled (x,y) coordinate of the node. For example, the node indicated by reference numeral 32 is uniquely identified as "302350687." In accordance with the present naming convention, the first digit indicates that the node is on layer 3. The next four digits indicate that the scaled x-coordinate of the node is 0235. The final four digits indicate that the scaled y-coordinate of the node is 0687. The scaling is configured such that every node has a unique coordinate assigned to it.

Furthermore, each node on a layer identifies the point where at least 2 resistors on the same layer intersect. Resistors are depicted and marked as "R3xxxxyyyy" where 3 indicates the layer number and xxxx and yyyy are the scaled (x,y) coordinates for the resistor. According to the present exemplary embodiment, resistor coordinates xxxx and yyyy are always even numbers. Thus, the resistor indicated by reference numeral 34 is uniquely identified as "R302340686." In accordance with the present naming convention, the first digit indicates that the identifier is associated with a resistor. The second digit indicates that the resistor is on layer 3. The next four digits indicate that the scaled x-coordinate of the resistor is 0234. The final four digits indicate that the scaled y-coordinate of the resistor is 0686. As with the nodes, the scaling is configured such that every resistor has a unique coordinate assigned to it.

Resistor orientation is also an important feature of the layout. A resistor is considered a "forward slash" ("/") resistor when xxxx+yyyy is evenly divisible by four (4). A "forward slash" resistor connects node xxxx−1, yyyy−1 to node xxxx+1, yyyy+1. A resistor is considered a "back slash" ("\") resistor when xxxx+yyyy is not evenly divisible by four (4). A "back slash" resistor connects node xxxx−1, yyyy+1 to node xxxx+1, yyyy−1. Resistors have a resistance value in ohms. The orientation of the resistor (i.e., forward slash or back slash) will be used to properly model the circuit in accordance with the design layout, even after the layout is converted to a netlist, as discussed further below.

Figure 4:
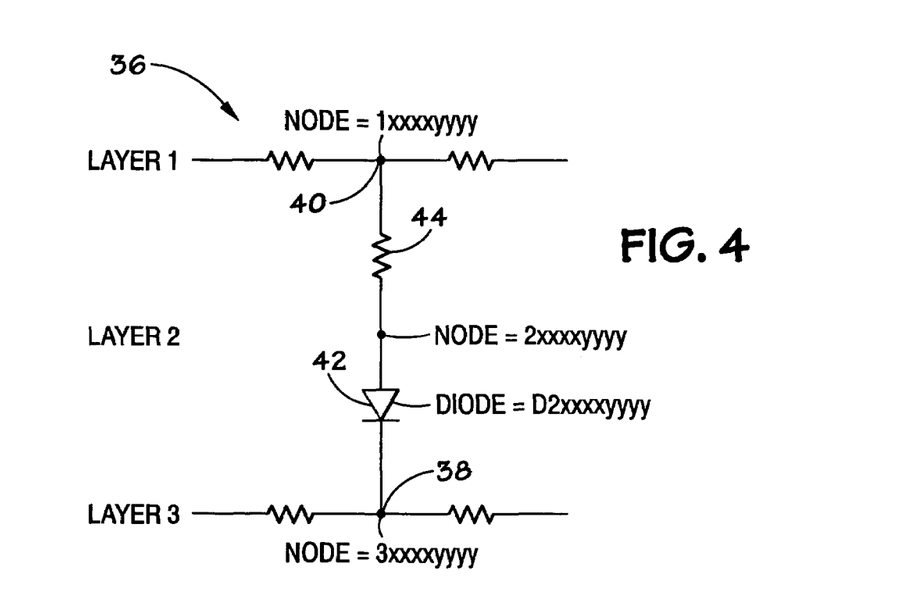
FIG. 4 is a schematic diagram illustrating a vertical view of an LED device having elements and nodes named in accordance with embodiments of the present techniques.

FIG. 4 illustrates the vertical elements in an exemplary portion of the LED device 14, generally indicated by reference numeral 36. Accordingly, a portion of each of layers 1, 2 and 3 is illustrated. As described above, layer 3 (the bottom layer in the present exemplary embodiment) includes a number of nodes, such as the node indicated by reference numeral 38. Similarly, layer 1 (the top layer) includes a number of nodes, such as the node indicated by reference numeral 40. The node naming follows the conventions described above with reference to FIG. 3. FIG. 4 also illustrates a portion of layer 2 that is located between layer 1 and layer 3 and includes the active diodes of the LED device 14, such as the diode 42. The naming convention of the diode 42 is similar to that of the resistors and is assigned in the form "D2xxxxyyyy," where the first digit is a "D" for diode and the second digit indicates the layer number. The next four digits indicate the x-coordinate and the final four digits indicate the y-coordinate. As can be appreciated, the diodes are only found in the vertical dimension of the model and appear under each odd numbered node under the P-region, here the P—GaN layer (layer 1). As can be appreciated, layer 2 may also include a number of resistors, such as the resistor indicated by reference numeral 44 and named according to the previously described naming conventions.

Returning again to FIG. 1, as discussed above, the output from the fracturing algorithm (block 26) includes a separate file for each layer. The scaling algorithm (block 28) retains this file separation in scaling and naming each node and element. Before running the simulations, the multiple output files may be appended in the proper order such that a single output file listing the boxes (orthogonal rectangles defined by LL and UR coordinates), layers and resistance values is created, as indicated by reference numeral 46. The "proper order" indicates the order in which the simulation package will expect to receive the output file. Generally, the proper order is layer 1 first, layer 2 second, layer 3 third, etc. The output is also ordered such that the outermost geometry is received first and the innermost geometry is received last. Accordingly, for the present exemplary embodiment, the proper order is defined as P—GaN (layer 1), P-Metal (layer 1), diode (layer 2, typically the same set of boxes used to define P—GaN), N-Field (layer 3), and N-Metal (layer 3).

Next, a netlist, such as a SPICE deck, may be generated from the appended list of LL/UR form boxes, layers and resistance values generated in block 46, as indicated in block 48. The manipulation of the output to create the netlist may be accomplished through a rasterization algorithm which exploits the naming convention described above. As used herein, "rasterization" refers to the process by which a primitive polygon (here, a box defined by the LL-UR coordinates) is converted to a two-dimensional image by determining which squares of an integer grid are occupied by the primitive polygon within the coordinate space. Using the above-referenced naming convention assures that resistors always fall on even coordinates and nodes always fall on odd coordinates. For a given coordinate for a resistor, the rasterization algorithm (block 48) determines whether the resistor is oriented as a forward slash or a back slash. A simple nested-for-loop in the rasterization algorithm (block 48) is used to step through the box from LL to UR in increments of two. Because the resistor orientation is known (i.e., forward slash or back slash), the algorithm can easily determine which two nodes are connected to either end of each element, such as the resistor.

In addition, the nested loop of the rasterization algorithm (block 48) may also be implemented to ensure that each node is connected to at least two different resistors on the same level. As can be appreciated, simulation programs such as SPICE are generally configured such that the code recognizes nodes as having at least two elements coupled thereto. This may be accomplished by keeping a list of nodes, subscripted by a resistor-layer pair, and incrementing that count for each node within the nested-for-loop. Upon completing the rasterization process (block 48) for the entire design, any node that is dangling (i.e., coupled to only a single resistor) is considered under-connected and is excluded from the final netlist to ensure that the netlist sent to the simulation package (SPICE) is valid.

As can be appreciated, the fracturing of the CAD file (block 26) in accordance with the presently described rasterization algorithm (block 48) automatically generates robust netlists or SPICE decks containing from 60,000 lines up to 300,000 lines or more of code. As previously discussed, manually written netlists generally comprise less than 1000 lines of code and are relatively labor intensive to write. More lines of code generally mean a greater resolution and more accurate characterization of the LED device 14. In accordance with the present techniques, additional lines of SPICE code may be manually added to the netlist generated by the rasterization algorithm (block 48) to provide final power supply connections to the device terminals and provide resistance values for resistors in the vertical direction through the LED device 14 (e.g., resistor 44 of FIG. 4). Typically, less than 20 additional lines of code are added manually. The manual supplementation of the netlist is generally indicated by block 50 of FIG. 1.

Next, the netlist is delivered to a software package to run the simulation of the model, as indicated in block 52. The simulation package may comprise AIM-SPICE, for example, which is the PC version of the SPICE program. Because AIM-SPICE is not generally configured to select the high volume of nodes to include in an output file, a Macro, such as an AIMSPICEDUMP Macro GUI robot, may be implemented to select output variables to be saved, as indicated in block 54. As can be appreciated, the introduction of the Macro improves user convenience and productivity and may compensate for the limited computer memory.

Running the simulation to execute the model represented by the netlist produces an output file indicating the simulated voltage drop at each node in the model. Because of the presently described naming convention for nodes, which retains the coordinates of each node, the voltage drop at each location can be analyzed. To make data analysis easier, the binary output file from AIM-SPICE may be converted and organized in tabular format, as indicated in block 56 of FIG. 1. For instance, an algorithm may be implemented to convert the results into an Excel-readable, CSV format.

Next, an algorithm may be implemented to prepare the simulation output data for contour plotting, as indicated in block 58. To prepare the data for contour plotting, the voltage output generated by the simulation package is substituted back into the netlist, and the resistance values may then be used to calculate the current at each node. Further, the (x,y) coordinate and level are extracted from the node name and reconverted back to CAD units (e.g., microns) or "unfractured" for contour plotting.

Figure 5:
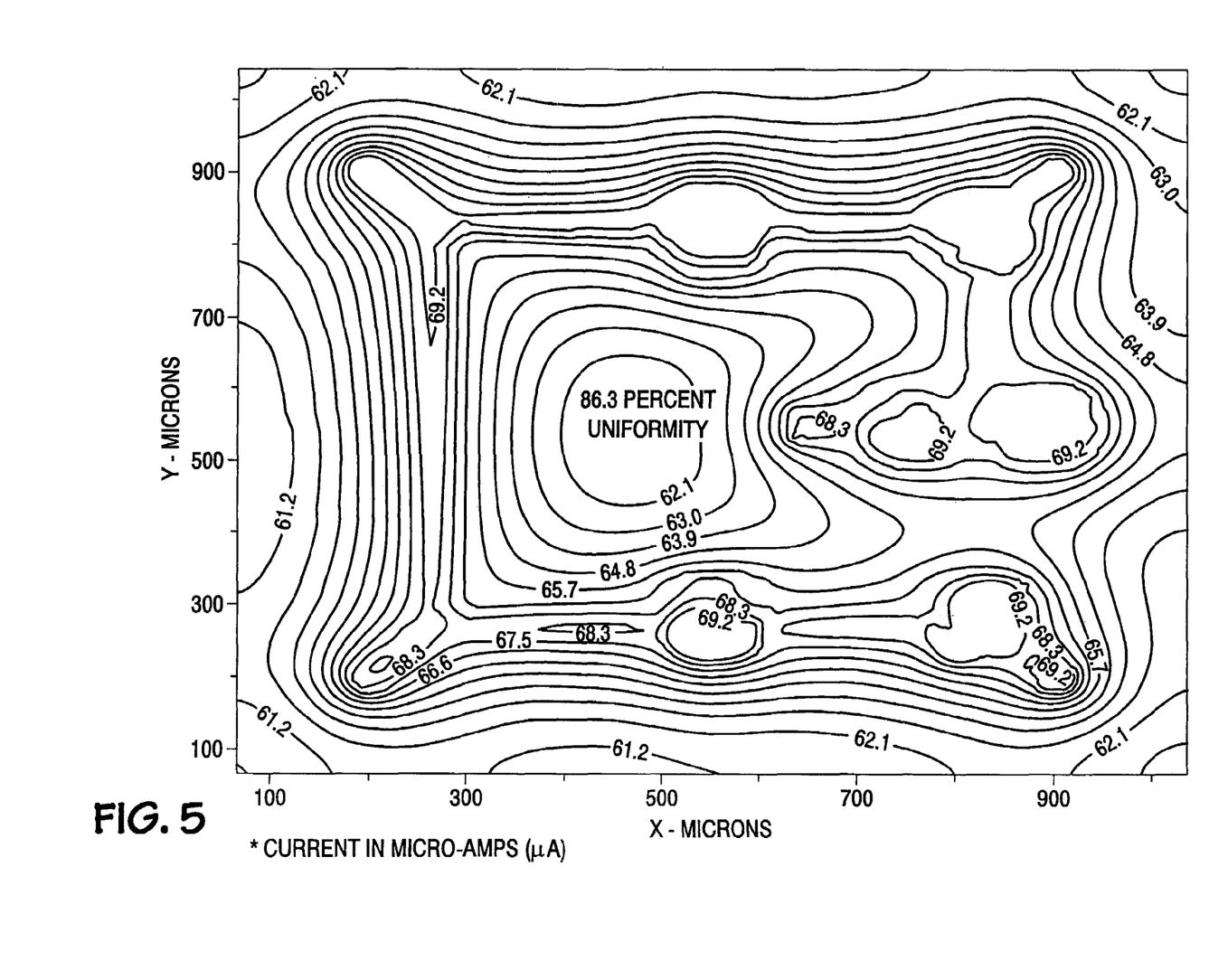
FIG. 5 is an exemplary contour plot produced by the data generated by implementing embodiments of the present techniques.

A contour plot can then be generated from the coordinate and layer data generated by the preparation algorithm (block 58), as indicated in block 60. A commercially available plotting package, such as Axum, may be used to generate the contour plot. FIG. 5 illustrates an exemplary contour plot. By unfracturing the data and plotting the current throughout the LED device 14, the current spreading throughout the LED device 14 may be analyzed and optimized for uniformity. To further assist in the analysis and optimization, the CSV data may be presented in tabular form such that it can be readily compared to other devices and other device designs, as indicated in block 62 of FIG. 1.

Advantageously, the presently described techniques include the capability to fracture complex CAD polygons into orthogonal boxes and to scale coordinates from CAD units (e.g., microns) into element size units. The presently described naming convention allows for easy rasterization of the boxes into model elements. The naming convention also preserves the location of each element through the circuit simulation package, enabling the post-simulation reconstruction of the current spreading plot. Further, the present techniques provide the ability to automatically eliminate under-connected nodes (i.e., nodes with less than two connections from the same layer) from the model, resulting in an error free simulation netlist (e.g., SPICE netlist). Still further the present techniques automate the tedious task of manually generating LED netlists, such as SPICE models, by allowing the designer to draw or edit the design concept in a familiar CAD environment and automatically generating the netlist from the CAD design.

Finally, the present techniques provide a more robust, geometry-based LED model which is easier to interpret, thereby facilitating simplified optimization of the design. As can be appreciated, providing the capability to evaluate current spreading uniformity through modeling without the need to manufacture actual devices saves both time and money. As previously described, a manufacturing run may take two months to complete, while the presently described modeling techniques may be executed in less than two hours. Advantageously, by implementing the present techniques, designers can optimize existing LED designs by understanding the significance and limitations of each drawn design feature and are encouraged to evaluate novel device structures, enabling breakthrough advancements in the industry.

The above-described base functions comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of modeling a light emitting diode device comprising:
    generating a computer-aided design layout of the light emitting diode device;
    fracturing the layout to convert design geometries into orthogonal rectangles defined by coordinates;
    scaling the layout to a specified element size, wherein the scaled layout includes each of a plurality of nodes, a plurality of resistors and a plurality of diodes each having a layer number and a unique coordinate associated therewith;
    automatically generating a netlist from the scaled layout; and
    executing the netlist to produce an output correlative to current spreading uniformity for the light emitting diode device.

2. The method, as set forth in claim 1, comprising producing a plurality of contour plots correlative to the current spreading uniformity for the light emitting diode device.

3. The method, as set forth in claim 1, comprising producing a tabular output correlative to the current spreading uniformity for the light emitting diode device.

4. The method, as set forth in claim 1, comprising naming each of the nodes such that a name of each node includes the layer number and the unique coordinate associated therewith.

5. The method, as set forth in claim 1, comprising naming each of the elements such that a name of each element includes an element type, the layer number and the unique coordinate associated therewith.

6. The method, as set forth in claim 1, comprising before executing the netlist, manually supplementing the netlist with information correlative to power connections.

7. The method, as set forth in claim 1, comprising before executing the netlist, manually supplementing the netlist with information correlative to elements oriented in the vertical direction of the light emitting diode device.

8. The method, as set forth in claim 1, comprising before generating the netlist, automatically eliminating any of the plurality of nodes having less than two of the plurality of resistors coupled thereto.

9. A method of modeling a light emitting diode device comprising:
    fracturing a computer aided design layout corresponding to the light emitting diode device to convert design geometries into orthogonal rectangles defined by coordinates;
    scaling the layout to a specified element size;
    adding a corresponding layer number and element value to elements and nodes in each of the orthogonal rectangles;
    automatically generating a netlist from the scaled layout;
    executing the netlist to produce a simulation output file;
    calculating currents associated with each of the elements; and
    producing a current output file comprising the currents associated with each of the elements.

10. The method, as set forth in claim 9, comprising converting the simulation output file into tabular form.

11. The method, as set forth in claim 9, comprising producing a plurality of contour plots from the current output file, wherein the contour plots are correlative to the current spreading uniformity of the light emitting diode device.

12. The method, as set forth in claim 9, comprising naming each of the elements such that a name of each element includes an element type, the layer number and the unique coordinate associated therewith.

13. The method, as set forth in claim 9, comprising naming each of the nodes such that a name of each node includes the layer number and the unique coordinate associated therewith.

14. The method, as set forth in claim 9, comprising before generating the netlist, automatically eliminating any of the nodes having less than two of the elements coupled thereto.

15. A method of modeling a light emitting diode device comprising:
    automatically generating a netlist from a computer-aided design layout of the light emitting diode device, wherein the design layout comprises each of a plurality of nodes, a plurality of resistors and a plurality of diodes;
    uniquely naming each of the plurality of nodes, the plurality of resistors and the plurality of diodes in accordance with location within the design layout to produce a unique name corresponding therewith; and
    modeling the light emitting diode device using the netlist to produce a modeling output, wherein the modeling output comprises the unique name corresponding to each of the plurality of nodes, the plurality of resistors and the plurality of diodes.

16. The method, as set forth in claim 15, wherein uniquely naming each of the plurality of resistors and each of the diodes comprises producing a unique name corresponding therewith and comprising an element type, a layer number and a unique coordinate associated therewith.

17. The method, as set forth in claim 15, wherein uniquely naming each of the plurality of nodes comprises producing a unique name corresponding therewith and comprising a layer number and the unique coordinate associated therewith.

18. A computer-readable medium storing computer instructions for:
   fracturing a computer-aided design layout corresponding to a light emitting diode device to convert design geometries into orthogonal rectangles defined by coordinates;
   scaling the layout to a specified element size, wherein the scaled layout includes each of a plurality of nodes, a plurality of resistors and a plurality of diodes each having a layer number and a unique coordinate associated therewith; and
   automatically generating a netlist from the scaled layout.

19. The computer-readable medium, as set forth in claim 18, comprising computer instructions for before generating the netlist, automatically eliminating any of the plurality of nodes having less than two of the plurality of resistors coupled thereto.

20. The computer-readable medium, as set forth in claim 18, comprising computer instructions for producing a plurality of contour plots correlative to the current spreading uniformity for the light emitting diode device.

21. The computer-readable medium, as set forth in claim 18, comprising computer instructions for producing a tabular output correlative to the current spreading uniformity for the light emitting diode device.

22. A computer-readable medium storing computer instructions for:
   fracturing a computer aided design layout corresponding to a light emitting diode device to convert design geometries into orthogonal rectangles defined by coordinates;
   scaling the layout to a specified element size;
   adding a corresponding layer number and element value to elements and nodes in each of the orthogonal rectangles;
   automatically generating a netlist from the scaled layout; and
   producing a contour plot corresponding to current uniformity in the light emitting diode device and correlative to an executed simulation of the netlist.

* * * * *